(12) United States Patent
Sakamoto et al.

(10) Patent No.: US 6,928,203 B2
(45) Date of Patent: Aug. 9, 2005

(54) VARIABLE OPTICAL FIBER GRATING AND DISPERSION COMPENSATOR

(75) Inventors: Akira Sakamoto, Sakura (JP); Satoshi Okude, Sakura (JP)

(73) Assignee: Fujikura Ltd., Tokyo (JP)

( * ) Notice: Subject to any disclaimer, the term of this patent is extended or adjusted under 35 U.S.C. 154(b) by 228 days.

(21) Appl. No.: 10/460,252

(22) Filed: Jun. 13, 2003

(65) Prior Publication Data

US 2004/0057665 A1 Mar. 25, 2004

(30) Foreign Application Priority Data

Jun. 19, 2002 (JP) .................................... 2002-178836
Apr. 17, 2003 (JP) .................................... 2003-113192

(51) Int. Cl.$^7$ ............................................... G02B 6/34
(52) U.S. Cl. ..................... 385/13; 385/37; 359/337.5
(58) Field of Search .................... 385/13, 37; 359/337.5

(56) References Cited

U.S. PATENT DOCUMENTS

| | | | | |
|---|---|---|---|---|
| 5,256,237 A | * | 10/1993 | Maas et al. | ................. 156/293 |
| 6,147,341 A | * | 11/2000 | Lemaire et al. | ........ 250/227.17 |
| 6,584,248 B2 | * | 6/2003 | Franzen et al. | ................. 385/37 |
| 2002/0154862 A1 | * | 10/2002 | Guerin et al. | ................. 385/37 |
| 2003/0026534 A1 | * | 2/2003 | Skull et al. | ................... 385/27 |

FOREIGN PATENT DOCUMENTS

CN       1388392 A       1/2003

OTHER PUBLICATIONS

A. Tanaka, et al., "Tunable Dispersion Compensation Fiber Grating based on Double Ring Structure", Technical Report of Institute of Electronics Information and Communication Engineers, OCS2002–97, OPE2002–103, LQE2002–153 (Nov. 2002), entitled, abstract.

A. Sakamoto et al., Preprint of 2002 Electronic Information Communication Society, Electronics Society Meeting, C–3–38, abstract.

K. Takahashi et al., Preprint of 2002 Electronics Information Communication Integrated meeting, C–3–140, abstract.

A. Sakamoto et al, Preprint of 2003 Electronic Information Communication Integrated Meeting C–13–115, abstact.

A. Sakamoto et al., "Tunable Second Order Dispersion Compensator using Fiber Grating with Double Ring Structure", OFC 2003/ vol. 1/37, No. MF33.

B.J. Eggleton et al., "Electrically tunable power efficient dispersion compensation fiber Bragg gratings for dynamic operation in nonlinear light wave systems", OFC 1999, PD27, 1999.

(Continued)

*Primary Examiner*—Akm Enayet Ullah
*Assistant Examiner*—Jerry T. Rahll
(74) *Attorney, Agent, or Firm*—Sughrue Mion, PLLC

(57) ABSTRACT

A variable optical fiber grating is provided which is compact, and in which an amount of chromatic dispersion can be effectively varied without changing an operating center wavelength. Also provided is a dispersion compensator, which uses this variable optical fiber grating. The fixing member is formed by providing an outer cylinder 2 comprising a material with a lower coefficient of linear expansion around an inner cylinder 1 comprising a material with a higher coefficient of linear expansion, and an optical fiber grating is fixed in a groove 3 formed on the inner cylinder 1. By adjusting the fixing position of the optical fiber grating, an expansion coefficient and contraction coefficient of the optical fiber grating which follows the expansion and contraction of the material with the higher coefficient of linear expansion, differ along the longitudinal direction of the optical fiber grating, so that an amount of chromatic dispersion is controlled.

26 Claims, 10 Drawing Sheets

OTHER PUBLICATIONS

M. M. Ohn et al., "Dispersion variable fiber Bragg grating using a piezoelectric stack", Electronics letters Oct. 10, 1996, vol. 32, No. 21, pp. 2000–2001.

S. Matsumoto et al., "tunable dispersion equalizer with a divided thin film heater", OFC 2001 TuS4–1.

A.H. Gnauk et al. "16×20–Gb/s, 400–km WDM Transmission Over NZDSF Using a Slope–Compensating Fiber–Grating Module", IEEE Photonics Technology Letters vol. 12, No. 4, Apr. 2000.

C. K. Madsen and G Lenz, "A Multi–channel Dispersion Slope compensating Optical All pass Filter" OFC 2000 WF5–1, pp94–96.

M. Yablonski et al., "Layered optical thin film allpass dispersion equalizer for compensation of dispersion slope of optical fibers" Electronics Letters Jun. 22, 2000, vol. 36, No. 3, pp 1139–1141.

Chee S. Goh et al., "Non–linearly Strain Chirped Fiber Bragg Grating with an Adjusting Dispersion Slope" IEEE Photonics Technology Letters, vol. 14, No. 5, pp–663–665 (2002).

A. Sakamoto et al., "Tunable FBG Dispersion Compensator with Double Ring Structure" ECOC2002, TDC/DCF Modules Oct. 3, 2002.

B.J. Eggleton et al., "Integrated Tunable Fiber Gratings for Dispersion Management in High–Bit Rate Systems" Journal Tunable Lightwave Technology, Col. 18, No. 10, pp. 1418–1432.

S. Matsumoto et al., "Tunable Dispersion Equalizer with a Divided Thin–Film Heater for 40–Gb/s RZ Transmissions" IEEE Photonics Technology Letters vol. 18, No. 8, Aug. 2001.

T. Imai, T. Komukai et al., "Dispersion Tuning of a Linearly Chirped Fiber Bragg Grating Without a Center Wavelength Shift by Applying a Strain Gradient" IEEE Photonics technology Letters, vol. 10 No. 6, Jun. 1998.

\* cited by examiner

VARIABLE OPTICAL FIBER GRATING AND DISPERSION COMPENSATOR

BACKGROUND OF THE INVENTION

1. Field of the Invention

The present invention relates to an optical fiber grating, and relates specifically to a variable optical fiber grating in which the amount of chromatic dispersion can be varied.

2. Description of the Related Art

An optical fiber Bragg grating (hereafter referred to as "FBG") is an optical fiber component having a characteristic of forming a periodic refractive index distribution in the longitudinal direction of the optical fiber and reflecting light of a specific wavelength. The reflected wavelength λ of this FBG can be expressed by equation (1), using the grating period Λ and the effective refractive index $n_{eff}$.

$$\lambda = 2n_{eff}\Lambda \quad (1)$$

This FBG is used in optical multiplexer/demultiplexers, optical switches, optical filters and the like, and is an essential component for optical communication. A chirped optical fiber grating, in which the grating period or the effective refractive index varies along the longitudinal direction of the optical fiber, is one example of an FBG. Chirped optical fiber gratings are widely used in broadband filters, but their application to chromatic dispersion compensation optical fiber gratings, which compensate for the accumulation of chromatic dispersion in the optical transmission path, is of particular interest.

FIG. 8 shows an outline of the structure of a dispersion compensation optical fiber grating. In FIG. 8, reference symbol 11 denotes an optical transmission path, and reference symbol 12 denotes an optical circulator. Light, which enters a port 1 of the optical circulator 12 from the transmission path 11, is transmitted to a port 2, and enters an optical fiber grating 13. This optical fiber grating 13 comprises a core 14 and a cladding 15, and a high refractive index section is provided on the core 14 to form a grating section 16. This optical fiber grating 13 is a chirped optical fiber grating, in which the period of the high refractive index section or effective refractive index varies along the longitudinal direction thereof.

The light, which enters the optical fiber grating 13, is reflected in the grating section 16, but since the grating period varies along the longitudinal direction of the optical fiber and the reflection position differs according to the wavelength, the reflected light travels different optical path lengths, determined by its wavelength. In the case shown FIG. 8, long wavelength light is reflected at the left side of the grating section 16 which has a long grating period or high effective refractive index, and short wavelength light is reflected at the right side of the grating section 16 which has a short grating period or low effective refractive index. When this reflected light extracted from the port 3 via the optical circulator 12, a time difference occurs for each wavelength. This wavelength dependent time difference is called chromatic dispersion, and is normally expressed in units of ps/nm.

For a wavelength of 1550 nm, the single mode optical fiber generally used in optical communication has chromatic dispersion of approximately 17 ps/nm per 1 km of fiber length. If chromatic dispersion is large, this results in widening of the width of the optical pulses transmitted through the optical fiber, and hence the information cannot be transmitted accurately because each pulse of a pulse train overlaps each other. Consequently, by using a dispersion compensation optical fiber grating designed to have the exact opposite chromatic dispersion to the chromatic dispersion produced by the optical fiber which constitutes the optical transmission path, it is possible to compensate for the chromatic dispersion which has accumulated in the optical transmission path, which leads to a considerable improvement in the optical communication system.

However, the chromatic dispersion produced in the optical transmission path varies according to the type and length of the optical fiber used. Consequently, in order to achieve complete dispersion compensation, it is necessary to design individual dispersion compensation optical fiber gratings for each fiber to be compensated.

Normally, the optical fiber grating is manufactured using a phase mask, but in order to manufacture optical fiber gratings with different specifications, phase masks with different characteristics are required. These phase masks are expensive, and hence the price of dispersion compensation optical fiber gratings is accordingly high.

In addition, because the chromatic dispersion of an optical transmission path varies according to environmental variations such as variations in temperature, the required amount of dispersion compensation varies between night and day and with the seasons. Consequently, a problem of ordinary dispersion compensation optical fiber gratings is that chromatic dispersion cannot be completely compensated for under all conditions. As a result, a dispersion compensation optical fiber grating which has a variable construction in which the dispersion characteristics can be varied according to need is required.

In order to change the dispersion characteristics of the dispersion compensation optical fiber grating, it is necessary to control the longitudinal direction dependency of the reflected wavelength, and several methods of such control have been proposed. One of these is a method in which a temperature distribution is applied to the optical fiber grating, and another is a method in which a strain distribution is applied.

The method in which a temperature distribution is applied to the optical fiber grating is a method in which the reflected wavelength is varied by providing a temperature distribution along the longitudinal direction of the optical fiber grating. In this method, it is required that an accurate temperature distribution be provided along the longitudinal direction of the optical fiber, but because it is difficult to obtain the desired shape for the temperature distribution using a point heat source, a distributed heat source is necessary. A method in which gold thin film is deposited on the optical fiber grating, and the temperature of the entire optical fiber grating is controlled, has been proposed as an example of such a method.

However, deposition apparatuses are expensive, which increases the manufacturing cost, and furthermore, in this method it is necessary to perform the deposition process while accurately changing the deposited film thickness in the longitudinal direction of the optical fiber grating, which requires intricate control. Furthermore, an operation for mounting electrodes on the portions on which gold has been deposited is also required, and the complex structure and need for precise operations results in poor yield, and consequently, higher costs.

Furthermore, since the reflection center wavelength of the optical fiber grating shifts towards the long wavelength side, it is difficult to change the amount of chromatic dispersion while the operating wavelength is set to a specific wavelength, which is required for a wavelength multiplexing communication.

On the other hand, the method for applying a strain distribution to the optical fiber grating changes the reflected light by applying different strains along the longitudinal direction of the optical fiber grating. However, using this method it is also difficult to obtain a construction in which the strain varies continuously along the longitudinal direction, and as such it is difficult to obtain a large variation in chromatic dispersion.

SUMMARY OF THE INVENTION

The present invention solves the above-described problems. The object of the present invention is to provide a compact-sized optical fiber grating capable of effectively changing its chromatic dispersion, and to provide an optical fiber grating having a variable chromatic dispersion characteristic without changing the operating center wavelength, and to provide a dispersion compensator which uses this variable chromatic dispersion optical fiber grating.

In order to solve the above problems, a first aspect of the present invention provides a variable optical fiber grating, in which an optical fiber grating is fixed in a fixing member comprising at least two materials, each having different coefficients of linear expansion, and formed by the material with the higher coefficient of linear expansion surrounded with the material with the lower coefficient of linear expansion, wherein an amount of chromatic dispersion is made variable by adjusting a fixing position of said optical fiber grating by constituting the optical fiber grating such that an expansion coefficient and contraction coefficient of said optical fiber grating changes along the longitudinal direction of said optical fiber grating followed by the expansion and contraction of the material with the higher coefficient of linear expansion.

As a result, it is possible to realize a variable chromatic dispersion optical fiber grating which is compact, and in which the amount of chromatic dispersion can be effectively changed.

A second aspect of the present invention is a variable optical fiber grating according to the first aspect, wherein the fixing member is formed by providing an outer cylinder comprising the material with a lower coefficient of linear expansion around an inner cylinder comprising the material with a higher coefficient of linear expansion, such that the shape of the interface between two materials having different coefficients of linear expansion forms a circle.

As a result, pressure generated at the interface can be made uniform.

A third aspect of the present invention is a variable optical fiber grating according to the first aspect or the second aspect, wherein both materials with different coefficients of linear expansion are made of metals.

As a result, it is possible to provide a variable optical fiber grating with high rigidity.

A fourth aspect of the present invention is a variable optical fiber grating according to the first aspect or the second aspect, wherein among both materials with different coefficients of linear expansion, only the material with the lower coefficient of linear expansion is made by a metallic material.

Consequently it is possible to obtain a large difference between the coefficients of linear expansion while retaining the outer rigidity.

A fifth aspect of the present invention is a variable optical fiber grating according to any one of the first through fourth aspects of the present invention, wherein the optical fiber grating fixed in the fixing member is a chirped optical fiber grating, in which a grating period or an effective refractive index of the optical fiber grating varies along the longitudinal direction of the optical fiber.

A sixth aspect of the present invention is a variable optical fiber grating according to any one of the first through fourth aspects of the present invention, wherein the grating period of the optical fiber grating fixed in the fixing member is constant along the longitudinal direction of the optical fiber.

As a result, this can be made a chirped optical fiber grating by means of temperature modulation.

A seventh aspect of the present invention is a variable optical fiber grating according to any one of the first through sixth aspects of the present invention, wherein a plurality of optical fiber gratings are fixed to the fixing member.

As a result, by changing the fixing position of the plurality of optical fiber gratings, the characteristics of each optical fiber grating can be varied simultaneously, so that a different characteristic variation can be given to each optical fiber grating.

An eighth aspect of the present invention is a variable optical fiber grating according to any one of the first through seventh aspects of the present invention, wherein a groove is formed in the material which constitutes the fixing member which has the higher coefficient of linear expansion, and the optical fiber grating is fixed in this groove.

Consequently, it is possible to exactly control the fixing position of the optical fiber grating.

A ninth aspect of the present invention is a variable optical fiber grating according to the eighth aspect, wherein resin is used to fix the optical fiber grating in the groove.

As a result, it is possible to accurately convey the expansion and contraction of the inner cylinder to the optical fiber grating.

A tenth aspect of the present invention is a variable optical fiber grating according to the ninth aspect, wherein a coefficient of linear expansion, a Young's modulus and a Poisson's ratio of the resin are the same as the coefficient of linear expansion, Young's modulus and Poisson's ratio of the material which has the higher coefficient of linear expansion of the materials which form the fixing member.

Consequently, the occurrence of strain difference between the fixing member and the resin caused by temperature variation is minimal, and the characteristics of the optical fiber grating can be stabilized.

An eleventh aspect of the present invention is a variable optical fiber grating according to any one of the first through tenth aspects of the present invention, wherein there is provided a temperature control mechanism for adjusting the temperature of the optical fiber grating.

As a result, the amount of chromatic dispersion can be accurately adjusted.

A twelfth aspect of the present invention is a variable optical fiber grating according to any one of the first through eleventh aspects of the present invention, wherein the optical fiber grating is fixed to the fixing member with the fixing position thereof set so that when the temperature varies within an operating temperature range, the directions of the variation in the reflected wavelength at each end of the optical fiber grating are mutually opposite.

Consequently, by means of temperature variation it is possible to change only the amount of chromatic dispersion, while suppressing variations in the reflected center wavelength, that is, the operating center wavelength.

A thirteenth aspect of the present invention is a dispersion compensator which compensates chromatic dispersion of an optical transmission path using the variable optical fiber grating according to any one of the first through twelfth aspects of the present invention.

As a result, a dispersion compensator, which is compact and capable of effectively performing chromatic dispersion compensation, can be realized.

DETAILED DESCRIPTION OF THE INVENTION

The preferred embodiments of the present invention are described in detail below.

The variable optical fiber grating of the present invention is formed by fixing an optical fiber grating to a fixing member. This fixing member comprises at least two materials, each having different coefficients of linear expansion, and is formed by the material with the higher coefficient of linear expansion surrounding with the material with the lower coefficient of linear expansion.

Figure 1:
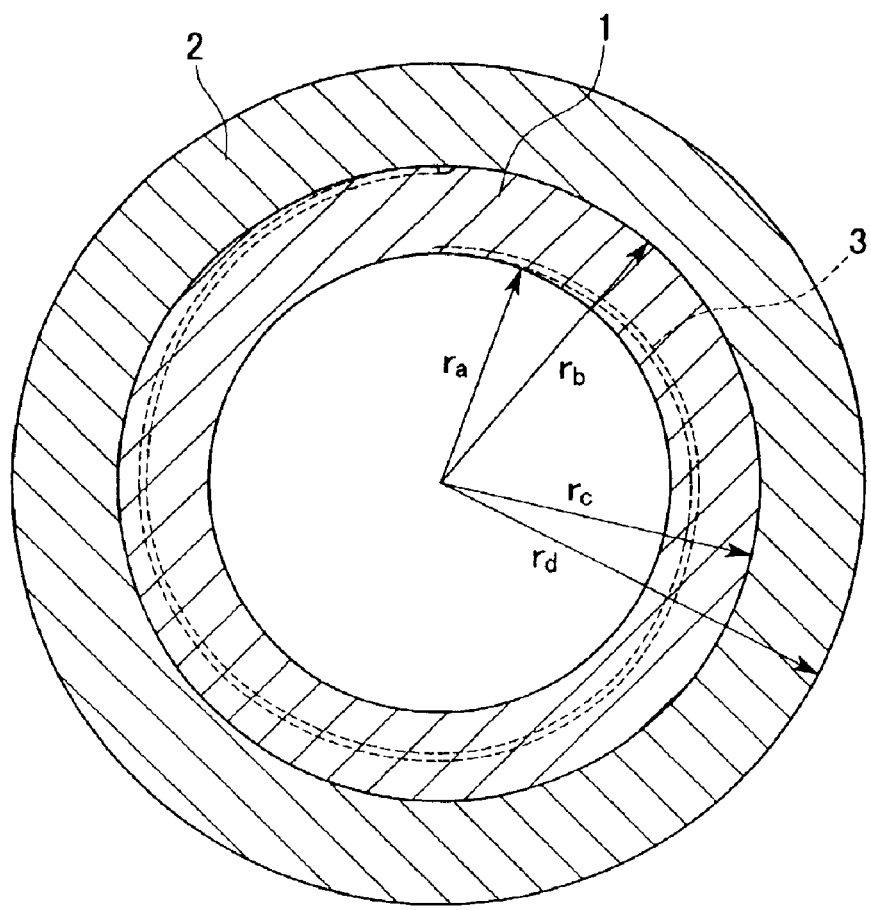
FIG. 1 shows a dual cylinder with a groove for an optical fiber grating of the present invention.

FIG. 1 is a view of an example of a dual cylinder with a groove used for variable optical fiber grating of the present invention.

In FIG. 1, reference symbol 1 denotes an inner cylinder comprising the material with the higher coefficient of linear expansion. An outer cylinder 2 comprising the material with the lower coefficient of linear expansion is joined to the periphery of this inner cylinder 1, and these two cylinders form the fixing member. Reference symbol 3 denotes a groove formed on the inner cylinder 1 comprising the material with the higher coefficient of linear expansion, and the optical fiber grating is fixed within this groove 3. In this example, the groove 3 formed on the inner cylinder 1 is a spiral groove having a spiral shape in the longitudinal direction of the inner cylinder 1, with a distance from the center axis of the inner cylinder 1 to the groove 3 differing along the longitudinal direction of the groove. In FIG. 1, the inner radius of the inner cylinder 1 is deemed $r_a$ and the outer radius $r_b$, while the inner radius of the outer cylinder 2 is deemed $r_c$ and the outer radius $r_d$.

The principle which enables variable optical fiber grating by means of temperature modulation, by using a construction in which an optical fiber grating is fixed to a fixing member having a dual cylinder construction comprising materials with different coefficients of linear expansion, while changing the distance from the center axis of the inner cylinder 1, and the optical fiber grating expands and contracts together with the materials of the inner cylinder 1, is described below.

Figure 2:
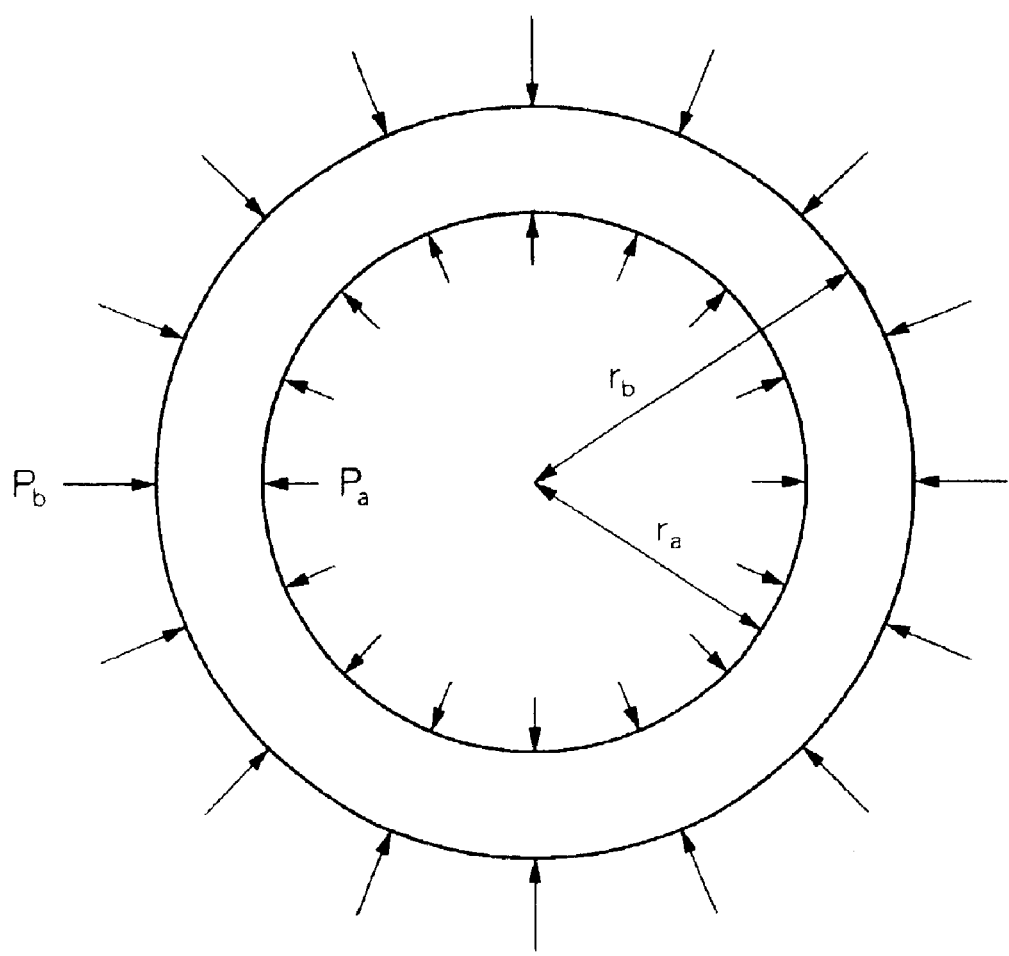
FIG. 2 shows the deformation of a cylinder caused by pressure.

First, as shown by the cross-section in FIG. 2, if an inside pressure of $P_a$ and an outside pressure of $P_b$ are applied to a cylinder with an inner radius $r_a$ and an outer radius $r_b$, a radial displacement u at a position from the center of the cylinder can be expressed by equation (2).

$$u = \frac{1-v}{E} \cdot \frac{r_a^2 P_a - r_b^2 P_b}{r_b^2 - r_a^2} r + \frac{1+v}{E} \cdot \frac{r_a^2 r_b^2 (P_a - P_b)}{r_b^2 - r_a^2} \cdot \frac{1}{r} \quad (2)$$

In equation (2), E is the Young's modulus of the materials which form the cylinders, and v is the Poisson's ratio.

A case of a dual cylinder as shown in FIG. 1 comprising two types of materials with mutually different coefficients of linear expansion is discussed next. Of the cylinders which form the dual cylinder, the coefficient of linear expansion of the inner cylinder (abbreviated to "cylinder 1" below) is deemed $\alpha_1$, and the coefficient of linear expansion of the outer cylinder (abbreviated to "cylinder 2" below) is deemed $\alpha_2$, and $\alpha_1$ is assumed to be greater than $\alpha_2$.

Figure 3:
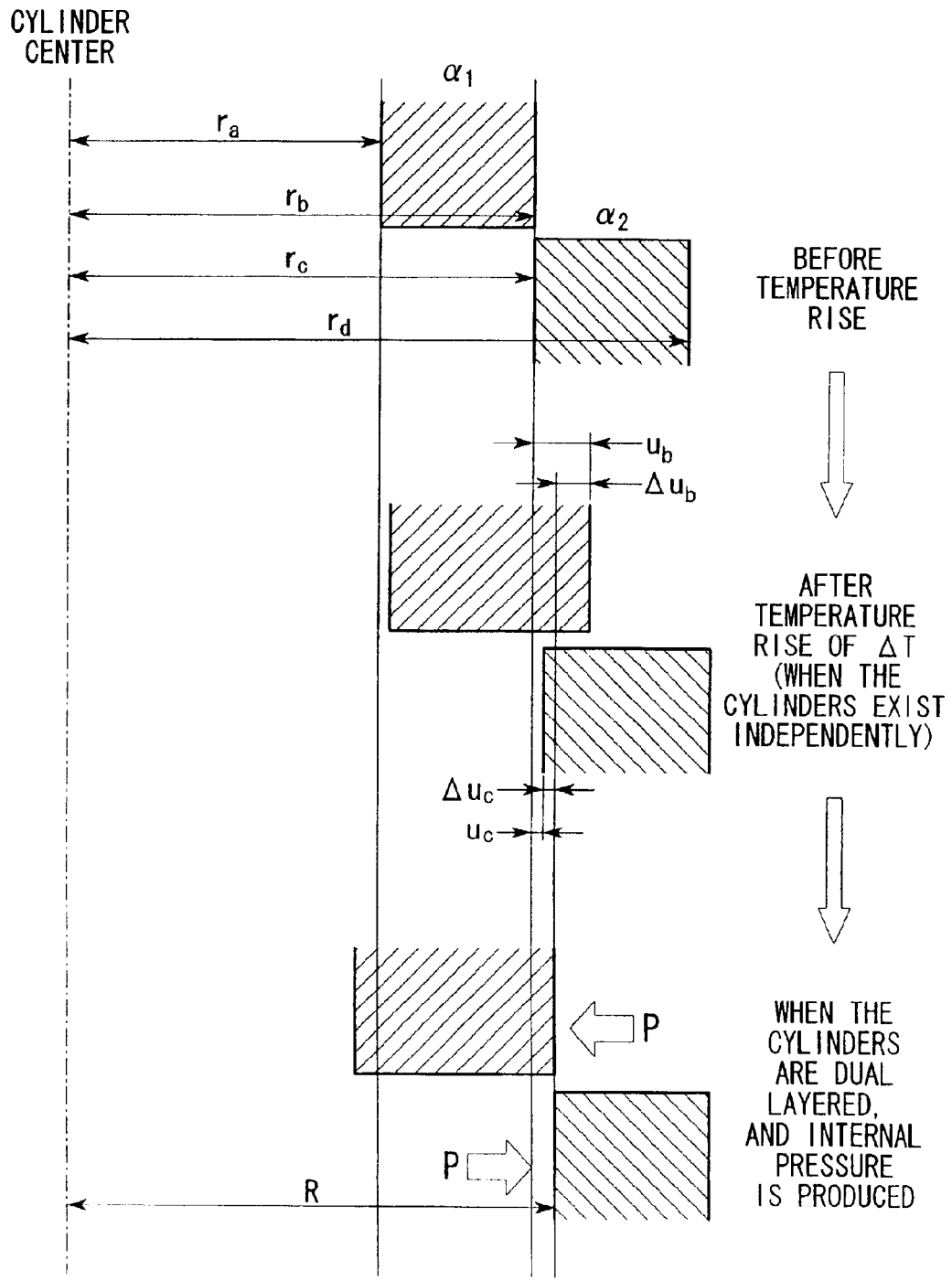
FIG. 3 shows the deformation of a dual cylinder caused by heat.

FIG. 3 shows one side of a cross-section along the center axis of this dual cylinder. In FIG. 3, the shaded sections indicate the cylinder 1 and the cylinder 2. Here, the inner radius of the cylinder 1 is deemed $r_a$, the outer radius of the cylinder 1 is deemed $r_b$, the inner radius of the cylinder 2 is deemed $r_c$ and the outer radius of the cylinder 2 is deemed $r_d$. Before any temperature variation, it is assumed that the outer radius $r_b$ of the cylinder 1 and the inner radius $r_c$ of the cylinder 2 are equal, and that $r_b = r_c = R$.

If the temperature rises by $\Delta T$, then in the case where the cylinder 1 and the cylinder 2 exist independently, since $\alpha_1 > \alpha_2$ the outer radius of the cylinder 1 expands to be larger than the inner radius of the cylinder 2.

The middle part in FIG. 3 shows such a situation, in which the cylinder 1 expands by $u_b$ in the radial direction, and the cylinder 2 expands by $u_c$ in the radial direction.

However, in the case where the cylinder 1 is fitted inside the cylinder 2, as with this dual cylinder, the outer radius of the cylinder 1 and the inner radius of the cylinder 2 must be equal, and as a result, pressure is produced at the interface between the cylinder 1 and the cylinder 2. The lower part of FIG. 3 shows such a situation, in which a pressure P is produced towards the center direction in the cylinder 1, and pressure P is produced in the cylinder 2, in the opposite direction to the center direction.

If this pressure is deemed P, the outer radius variation amount $\Delta u_b$ of the cylinder 1 caused by this pressure P can be determined as shown in equation (3), by substituting $P_a=0$, $P_b=P$ and $r=r_b$ in equation (2).

$$\Delta u_b = -\frac{P}{E_1}\left(\frac{r_a^2 + r_b^2}{r_b^2 - r_a^2} - v_1\right) r_b \quad (3)$$

In the same manner, the inner radius variation amount $\Delta u_c$ of the cylinder 2 can be determined as shown in equation (4), by substituting $P_a=P$, $P_b=0$ and $r=r_c$ in equation (2).

$$\Delta u_c = +\frac{P}{E_2}\left(\frac{r_c^2 + r_d^2}{r_d^2 - r_c^2} + v_2\right) r_c \quad (4)$$

Here, the difference between the variation amounts $u_b$ and $u_c$ corresponds to the degree of overlap of the cylinder 1 and the cylinder 2 which occurs due to a rise in temperature. In contrast, the variation amount in the radius r when the temperature rises by $\Delta T$ in a cylinder with the coefficient of linear expansion $\alpha$ is $\alpha r \Delta T$, the difference between $u_b$ and $u_c$ is as shown by the equation (5).

$$|\Delta u_b| + |\Delta u_c| = u_b - u_c = (\alpha_1 - \alpha_2) R \Delta T \quad (5)$$

Since $r_b$ and $r_c$ are approximately equal, then assuming that $r_b = r_c = R$, the pressure produced at the interface between the cylinder 1 and the cylinder 2 by a change in temperature of $\Delta T$ is as shown by equation (6), based on equations (3), (4) and (5).

$$P = \frac{(\alpha_1 - \alpha_2)\Delta T}{\frac{1}{E_1}\left(\frac{r_a^2 + R^2}{R^2 - r_a^2} - v_1\right) + \frac{1}{E_2}\left(\frac{R^2 + r_d^2}{r_d^2 - R^2} + v_2\right)} \quad (6)$$

If this pressure P is substituted for $P_b$ in equation (2), and assuming that $P_a=0$, the amount of displacement $u_r$ at a location r in the cylinder 1 due to a change in temperature of $\Delta T$ can be determined as shown in equation (7), where P in equation (7) is the P expressed by equation (6).

$$u_r = -\left(\frac{1-v_1}{E_1} \cdot \frac{R^2}{R^2 - r_a^2} \cdot r + \frac{1+v_1}{E_1} \cdot \frac{r_a^2 R^2}{R^2 - r_a^2} \cdot \frac{1}{r}\right) P \quad (7)$$

The total displacement $u_T$ at the location of the radius r of the cylinder 1 caused by a temperature variation is the sum of the expansion $\alpha_1 r \Delta T$ caused by heat, and the displacement $u_r$ caused by the presence of the outer cylinder. Accordingly, $u_T$ is expressed by equation (8).

$$u_T = \alpha_1 r \Delta T + u_r \quad (8)$$

$$= \alpha_1 r_a \Delta T - \left(\frac{1-v_1}{E_1} \cdot \frac{R^2}{R^2 - r_a^2} \cdot r + \frac{1+v_1}{E_1} \cdot \frac{r_a^2 R^2}{R^2 - r_a^2} \cdot \frac{1}{r}\right) P$$

Because the contraction coefficient in the circumference direction is expressed by u/r, the effective coefficient of linear expansion $\alpha_{total}$ at the position of the radius r in the cylinder 1 is shown by equation (9).

$$\alpha_{total} = \frac{u_T}{r} \cdot \frac{1}{\Delta T} \quad (9)$$

$$= A - B \cdot \frac{1}{r^2}$$

where $$A = \alpha_1 - \frac{1-v_1}{E_1} \cdot \frac{R^2}{R^2 - r_a^2} \cdot \frac{(\alpha_1 - \alpha_2)}{\frac{1}{E_1}\left(\frac{r_a^2 + R^2}{R^2 - r_a^2} - v_1\right) + \frac{1}{E_2}\left(\frac{R^2 + r_d^2}{r_d^2 - R^2} + v_2\right)}$$

$$B = \frac{1+v_1}{E_1} \cdot \frac{r_a^2 R^2}{R^2 - r_a^2} \cdot \frac{(\alpha_1 - \alpha_2)}{\frac{1}{E_1}\left(\frac{r_a^2 + R^2}{R^2 - r_a^2} - v_1\right) + \frac{1}{E_2}\left(\frac{R^2 + r_d^2}{r_d^2 - R^2} + v_2\right)}$$

In this manner, if materials with different coefficients of linear expansion are joined so that the contour of the contact surface therebetween is a circle, the effective coefficient of linear expansion of the inner material varies in the radial direction.

Next, a method of controlling the chromatic dispersion of an optical fiber grating using the fixing member with a dual cylinder construction mentioned above is described. Since the reflected wavelength of the optical fiber grating is expressed by equation (1), the temperature dependency $d\lambda/dT$ of the reflected wavelength is as shown by equation (10).

$$\frac{d\lambda}{dT} = 2\left(\frac{\partial n_{\mathit{eff}}}{\partial T} \cdot \Lambda + \frac{\partial \Lambda}{\partial T} \cdot n_{\mathit{eff}}\right) \quad (10)$$

In addition, if the coefficient of linear expansion of the optical fiber is deemed $\alpha$, this can also be expressed as $\partial \Lambda/\partial T = \alpha \Lambda$, and therefore equation (10) can be rewritten as equation (11).

$$\frac{d\lambda}{dT} = 2\left(\frac{\partial n_{\mathit{eff}}}{\partial T} \cdot \Lambda + \alpha \Lambda \cdot n_{\mathit{eff}}\right) \quad (11)$$

$$= 2\left(\frac{\partial n_{\mathit{eff}}}{\partial T} + \alpha n_{\mathit{eff}}\right)\Lambda$$

Here, the refractive index temperature dependency of fused quartz is $\partial n/\partial T=+9.8\times10^{-6}$, and is a constant value.

If the longitudinal direction of the optical fiber is termed the X axis, since the optical fiber grating used herein is a chirped optical fiber grating, the grating period $\Lambda$ is a function of X. Here, for simplicity, a case of a linearly chirped optical fiber grating, which is the most commonly used optical fiber grating for dispersion compensation, is examined. In this case, the grating period $\Lambda$ can be expressed by equation (12).

$$\Lambda = \Lambda_0 + CX \quad (12)$$

Here, $\Lambda_0$ is a constant, and C is a constant called the chirp rate, and this expresses the rate of change of the grating period. The temperature dependency of the chromatic dispersion amount of the optical fiber grating can be found by substituting this equation (12) into equation (11) and taking the first derivative of the equation with respect to X. The first derivative of the equation (12) yields the equation (13) as follows.

$$\frac{d}{dx} \cdot \frac{d\lambda}{dT} = 2n_{eff}\Lambda \frac{d\alpha}{dx} + 2n_{eff}\alpha \frac{\partial \Lambda}{\partial x} + 2\frac{\partial \Lambda}{\partial x} \cdot \frac{dn_{eff}}{dT} \quad (13)$$

Since the amount of second and third terms of the right hand of the equation (13) is small, when these terms are neglected then the equation (14) is obtained.

$$\frac{d}{dx} \cdot \frac{d\lambda}{dT} = 2n_{eff}\Lambda \frac{d\alpha}{dx} \quad (14)$$

Normally, the coefficient of linear expansion α is constant in the longitudinal direction of the optical fiber, the right side becomes zero, so that the chromatic dispersion does not change by the temperature change.

On the other hand, when it is assumed that the linear thermal expansion α changes in the longitudinal direction along the equation (15) as follows, $$\alpha = \alpha_0 + \alpha_x X \quad (15)$$

the first derivative of equation (11) is as shown by the equation (16).

$$\frac{d^2}{dx^2} \cdot \frac{d\lambda}{dT} = 2n_{eff}C\alpha_x X \quad (16)$$

The construction in which the variation amount of chromatic dispersion has dependency in the longitudinal direction of the optical fiber grating can be obtained. As a result, it is possible to control the amount of chromatic dispersion by means of temperature modulation.

When in this manner, the fixing member of a dual cylinder construction is formed in using materials having different linear expansion coefficients, the linear expansion coefficient of the inner cylinder has different values in the radial direction. If the optical fiber grating is fixed to this fixing member, and the fixing position thereof adjusted so that the coefficient of linear expansion of the optical fiber grating varies along the longitudinal direction, it is possible to control the amount of chromatic dispersion by means of temperature modulation.

For example, by employing a construction in which the optical fiber grating is fixed to the inner cylinder of the fixing member comprising a dual cylinder, while changing the distance from the center axis of the inner cylinder, and the optical fiber grating expands and contracts together with the material which forms the inner cylinder, the amount of chromatic dispersion can be controlled by means of temperature modulation. Fixing the optical fiber grating while changing the distance thereof from the center axis of the inner cylinder 1 can be achieved by forming the groove formed on the inner cylinder 1 in a spiral shape as shown in FIG. 1, and fixing the optical fiber grating to this spiral groove.

Furthermore, the number of optical fiber gratings fixed to the fixing member is not limited to one, and a plurality of optical fiber gratings may be fixed thereto. In this case, by changing the fixing positions of the plurality of optical fiber gratings, the characteristics of each optical fiber grating can be varied simultaneously, so that a different characteristic variation can be given to each optical fiber grating.

A possible method for fixing the optical fiber grating to the inner cylinder is a method in which a groove with the same diameter as the optical fiber grating or larger, is made on the inner cylinder section, and the optical fiber grating is fixed along this groove. By providing the groove in a previously planned position, the optical fiber grating can be fixed to accurately match the position from the center of the inner cylinder.

Furthermore, by filling the groove with resin or the like after the optical fiber grating is inserted into the groove, it becomes possible to reliably convey the expansion and contraction of the inner cylinder to the optical fiber. At this time, if the physical properties such as the coefficient of linear expansion, Young's modulus and Poisson's ratio of the resin used to fill the groove are the same as the physical properties of the inner material of the fixing member, the occurrence of strain difference between the inner cylinder and the resin caused by temperature variation is minimal, and the characteristics can be stabilized. Therefore, it is preferable that the physical properties of the resin are the same as the physical properties of the inner material of the fixing member.

Regarding the combination of the materials used as the fixing member, the materials must have different coefficients of linear expansion, but using metals for both of the materials results in higher rigidity. Furthermore, in order to obtain greatly variable characteristics with regard to chromatic dispersion, the difference between the coefficients of linear expansion of the two materials should be as large as possible. Therefore, it is preferable that the outer cylinder is formed from metal, and the inner cylinder is formed from a non-metallic material such as fluoroplastic or plastic.

Furthermore, in the description above, the shape of the fixing member is a cylinder, but provided that the coefficients of linear expansion of the inner material and the outer material are different, wavelength shift can be obtained due to pressure being produced at the contact surface as a result of a rise in temperature, and consequently another shape could be used which better suits the purpose. However, because the pressure produced at the interface is uniform if the contact surfaces of the two materials are circular, then it is preferable that the contact surfaces are circular. Methods for tightly fitting the two materials together in a circular shape include shrink fitting and press fitting.

Controlling the amount of chromatic dispersion based on changes in temperature as described above is enabled by incorporating a temperature control mechanism for adjusting the temperature of the optical fiber grating.

According to this example of the variable optical fiber grating, the optical fiber grating is fixed to the fixing member, which comprises at least two materials each having different coefficients of linear expansion, and is formed by the material with the higher coefficient of linear expansion surrounding with the material with the lower coefficient of linear expansion, and the amount of chromatic dispersion is made variable by adjusting the fixing position of the optical fiber grating so that an expansion coefficient and contraction coefficient of the optical fiber grating which follows the expansion and contraction of the material with the higher coefficient of linear expansion, differ along the longitudinal direction of the optical fiber grating. As such it is possible to realize a variable optical fiber grating which is compact, and in which the amount of chromatic dispersion can be effectively varied.

An example of a dispersion compensator of the present invention is described below.

Figure 8:
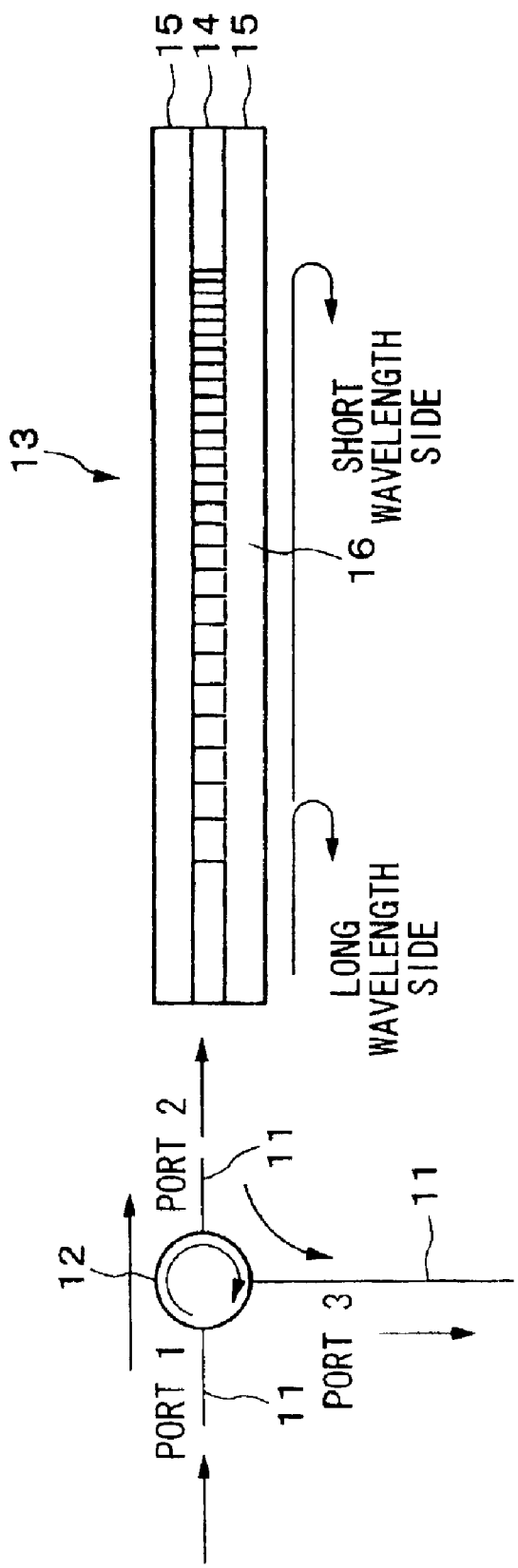
FIG. 8 shows the structure of a dispersion compensator, based on fiber Bragg grating.

As shown in FIG. 8, the dispersion compensator in this example is formed by connecting the variable optical fiber grating described above to an optical circulator 12, for example, and the amount of chromatic dispersion in the variable optical fiber grating is controlled so as to cancel out the cumulative dispersion produced by the optical transmission path 11. Consequently, an optical signal accompanied with cumulative dispersion produced by a transmission path 11 is dispersion compensated by passing the signal from a port 1 of the optical circulator to a port 2 and then reflecting by an optical fiber grating 13. This reflected light is then output from the port 2 of the optical circulator through a port 3.

According to the dispersion compensator in this example, by employing a construction in which the chromatic dispersion produced in the optical transmission path is compensated using the variable optical fiber grating of the present invention, a dispersion compensator, which is compact and capable of effectively performing chromatic dispersion compensation, can be realized.

A specific example is described below.

A variable optical fiber grating was manufactured by forming a fixing member of a dual cylinder construction using the materials shown in Table 1, and fixing an optical fiber grating to this fixing member.

TABLE 1

| Name of Material | Coefficient of Linear Expansion $(10^{-6})[1/K]$ | Young's Modulus $10^{10}$ [Pa] | Poisson's ratio |
| --- | --- | --- | --- |
| Titanium | 8.6 | 11.57 | 0.321 |
| Invar | 0.13 | 14.4 | 0.259 |
| Aluminum | 23.1 | 7.03 | 0.345 |
| PCTFE | 60 | 0.15 | 0.4 |
| PTFE | 100 | 0.05 | 0.4 |

Of the materials shown in Table 1, invar and titanium were used as the outer cylinder material, and aluminum, polytetrafluoro ethylene (referred to as "PTFE" below), and polychlorotrifluoro ethylene (referred to as "PCTFE" below) were used as the inner cylinder material. The coefficient of linear expansion, Young's modulus and Poisson's ratio shown in Table 1 were substituted into equation (9) to determine the radial dependency of the coefficient of linear expansion in the inner cylinder. Here, it was assumed that $r_a$=2.5 cm, R=3.5 cm, and $r_b$=4.5 cm.

Next, the determined coefficient of linear expansion α was substituted into equation (11), and the extent of wavelength shift caused by temperature variation for an optical fiber grating having this coefficient of linear expansion determined. Here, assuming the grating period to be the normally used 1.55 μm wavelength band, Λ=531 nm, and $n_{eff}$=1.455, $\partial n/\partial T$=9.8×10$^{-6}$.

Figure 4A:
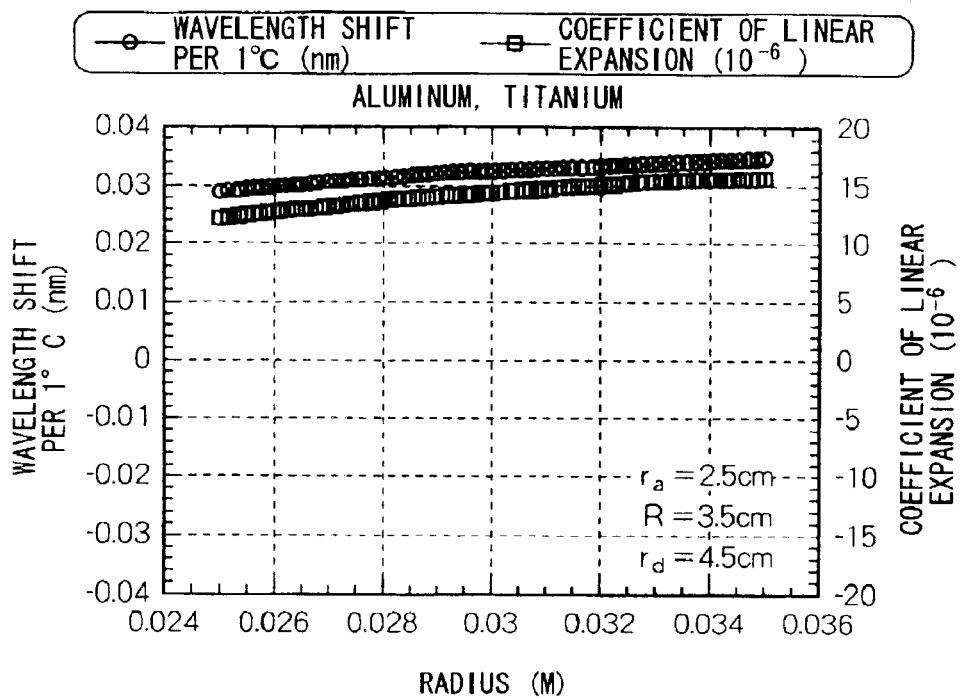
FIG. 4 shows the wavelength shift amount of an optical fiber grating fixed in the fixing member (inner cylinder) per 1° C., and the effective coefficient of linear expansion of fixing member (inner cylinder), when an inner cylinder is formed from aluminum, and (a) an outer cylinder is formed from titanium, or (b) the outer cylinder is formed from invar.
Figure 4B:
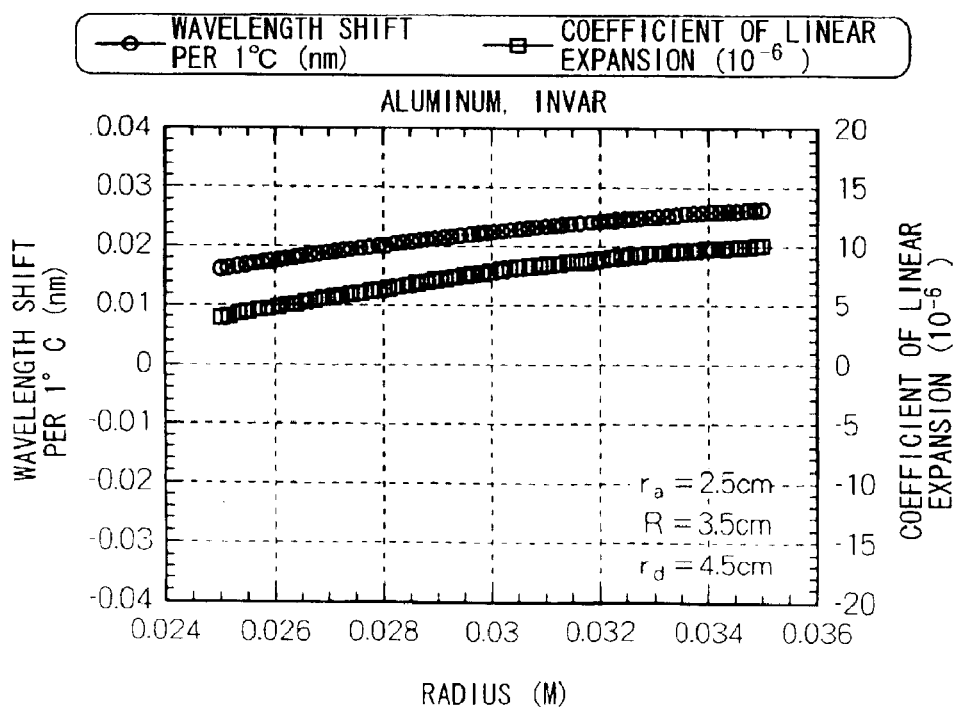
Figure 5A:
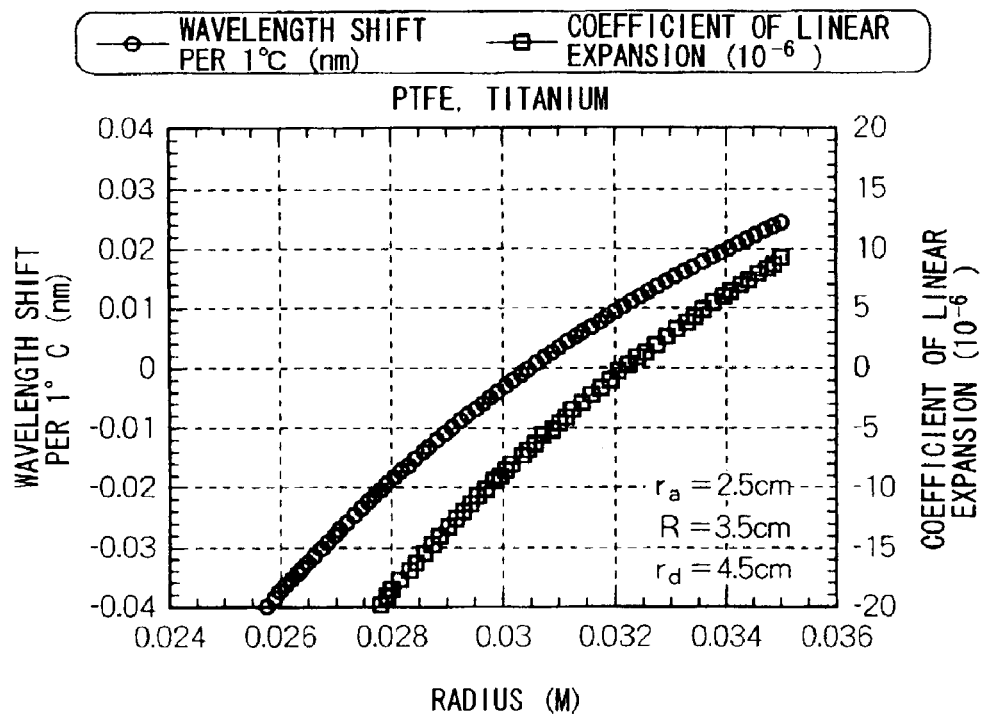
FIG. 5 shows the wavelength shift amount of an optical fiber grating per 1° C., when the inner cylinder is formed from PTFE, and (a) the outer cylinder is formed from titanium, or (b) the outer cylinder is formed from invar.
Figure 5B:
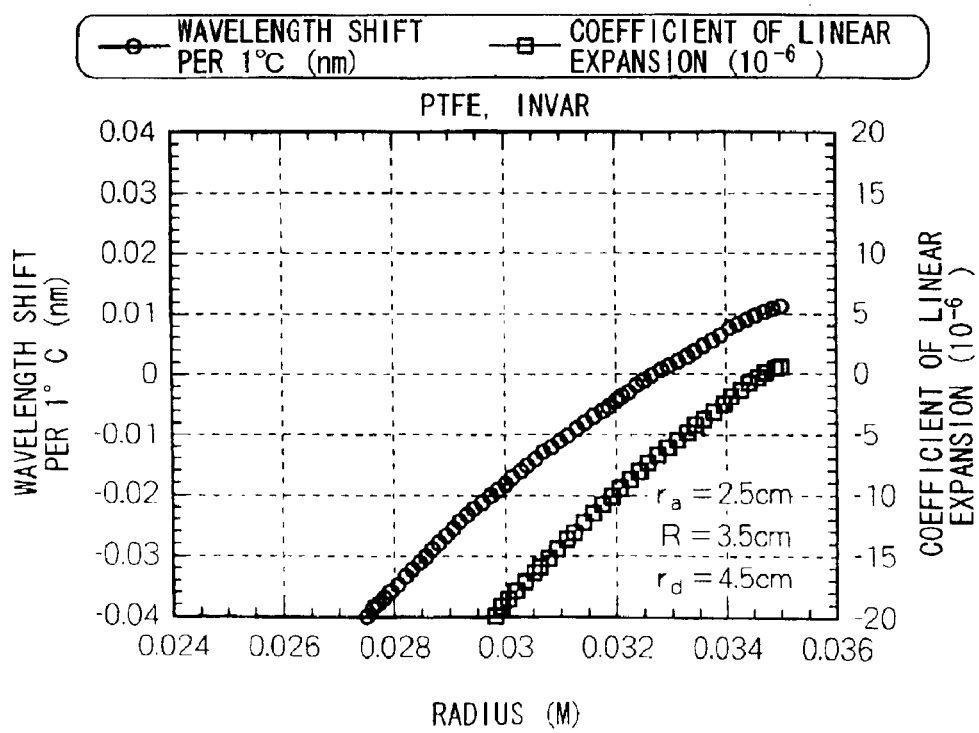
Figure 6A:
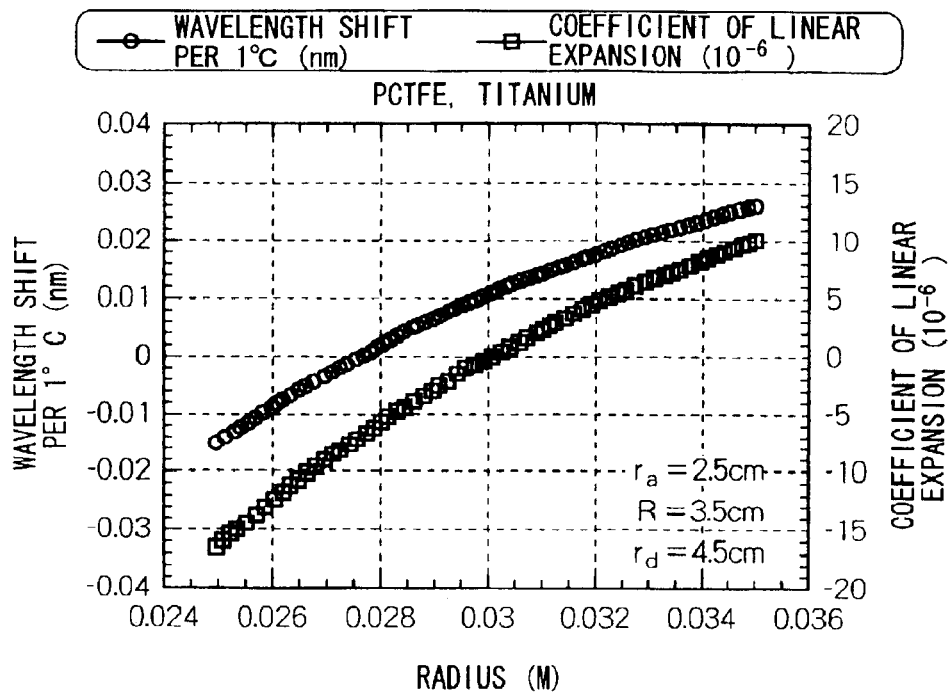
FIG. 6 shows the wavelength shift amount of the optical fiber grating per 1° C., when the inner cylinder is formed from PCTFE, and (a) the outer cylinder is formed from titanium, or (b) the outer cylinder is formed from invar.
Figure 6B:
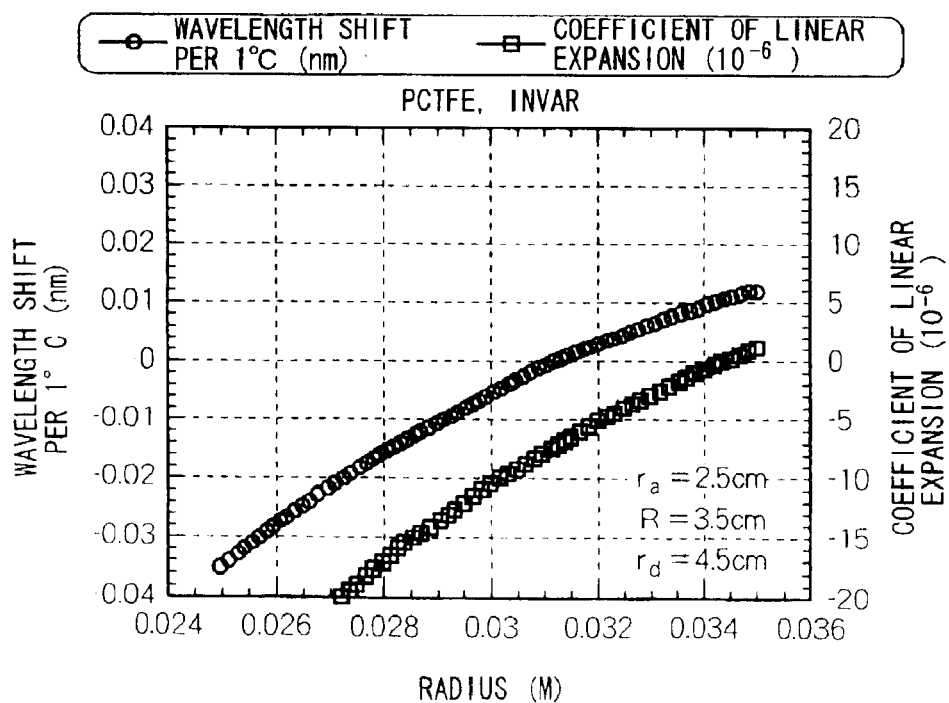

The calculation results in this case are shown in FIG. 4 through FIG. 6.

FIG. 4 shows a case when the inner cylinder was formed from aluminum, FIG. 5 shows a case when the inner cylinder was formed from PTFE, and FIG. 6 shows a case when the inner cylinder was formed from PCTFE. In each, (a) shows a case where the outer cylinder was formed from titanium, and (b) shows a case where the outer cylinder was formed from invar.

The results of converting the thus obtained wavelength shift amount to a variable range for the amount of chromatic dispersion of the optical fiber grating are shown below.

At present, the mask lengths of commercially purchasable phase masks are approximately 100 mm. Therefore, if the grating length is accordingly set to 100 mm, and the reflection bandwidth is set to 1.2 nm, which is the bandwidth required in order to compensate the chromatic dispersion of one WDM wavelength, the amount of chromatic dispersion of the optical fiber grating is 800 ps/nm. This optical fiber grating was fixed to the fixing member shown in FIG. 4(a), the inner cylinder of which was formed from aluminum and the outer cylinder of which was formed from titanium.

At this time, if the long wavelength reflecting side of the optical fiber grating is fixed to the position of the outermost diameter (r=3.5 cm) of the inner cylinder and the short wavelength reflecting side is fixed to the position of the innermost diameter (r=2.5 cm), the long wavelength reflecting side shifts towards the long wavelength side by 0.0346 nm per 1° C., and the short wavelength reflecting side shifts towards the long wavelength side by 0.0291 nm per 1° C. Therefore, the bandwidth of the optical fiber grating increases by 0.0055 nm (=0.0346 nm–0.0291 nm) per 1° C.

If the amount of temperature variation is 30° C., then the variation in the bandwidth is 0.0055 nm/° C.×30° C.=0.165 nm. If the grating length is constant, because the bandwidth and the amount of chromatic dispersion have an inverse proportion relation, the amount of chromatic dispersion is 800 ps/nm×1.2 nm/(1.2 nm+0.165 nm)=703 ps/nm, and the variation thereof is 800–703=93 ps/nm.

This variation of 93 ps/nm in the chromatic dispersion is approximately the same as the variation in the chromatic dispersion when the temperature has varied by 100° C. (from –30° C. to 70° C.) in 480 km of the optical fiber generally used for transmission, which is a value sufficient to compensate for the variation caused by the temperature of the optical transmission path.

Furthermore, if the fixing positions of the long wavelength reflecting side and the short wavelength reflecting side of the optical fiber grating are reversed, a rise in temperature causes the bandwidth to narrow. Therefore, the amount of chromatic dispersion when the temperature has risen by 30° C. is 800 ps/nm×1.2 nm/(1.2 nm–0.165 nm)= 928 ps/nm, and it is also possible to increase the amount of chromatic dispersion by 928–800=128 ps/nm.

In addition, in a case where the inner cylinder was formed from aluminum and the outer cylinder was formed from invar, or a case where the inner cylinder was formed from PCTFE or PTFE, because the radial dependency of the wavelength shift amount is larger per unit of temperature, a larger variable range can be obtained for the same temperature variation range. Furthermore, with the same variable range, dispersion compensation can be performed within a smaller temperature range.

For example, when the optical fiber grating is fixed to a fixing member, the inner cylinder of which is formed from PCTFE and the outer cylinder of which is formed from invar, the wavelength shift at the innermost diameter of the inner cylinder is –0.035 nm/° C., and the wavelength shift at the outer most diameter is 0.012 nm/° C., and consequently, the band variation per 1° C. is 0.012–(–0.035) nm/° C.=0.047 nm/° C. Since bandwidth variation of 0.165 nm is needed to obtain the same variation of 93 ps/nm as above, this gives 0.165/0.047=3.5° C., showing that this can be achieved by temperature variation of only 4° C. or thereabouts.

Furthermore, by fixing an optical fiber grating which has a constant grating period in the longitudinal direction to the fixing member described above, this can be made a chirped fiber grating by means of temperature modulation. For example, if the optical fiber grating is fixed to a fixing member wherein the inner cylinder is formed from PCTFE and the outer cylinder is formed from invar, the bandwidth variation per 1° C. is 0.046 nm. Therefore, to make this a chirped optical fiber grating with bandwidth of 1.2 nm, since 1.2/0.046 =26° C., the temperature is varied by 26° C. An optical fiber grating with a uniform period can be used as an optical fiber grating with sufficient bandwidth to allow use as a dispersion compensation fiber grating.

If in this manner the inner cylinder is formed from PCTFE or PTFE, it is possible to reverse the direction of the wavelength shift of the optical fiber grating, according to the fixing position of the optical fiber grating. Consequently, since it is possible to reverse the variation direction of the reflected wavelength at both ends of the optical fiber grating, it is possible to change only the amount of chromatic dispersion, while suppressing variations in the reflected center wavelength, that is, the operating center wavelength, by means of temperature variation.

Figure 7:
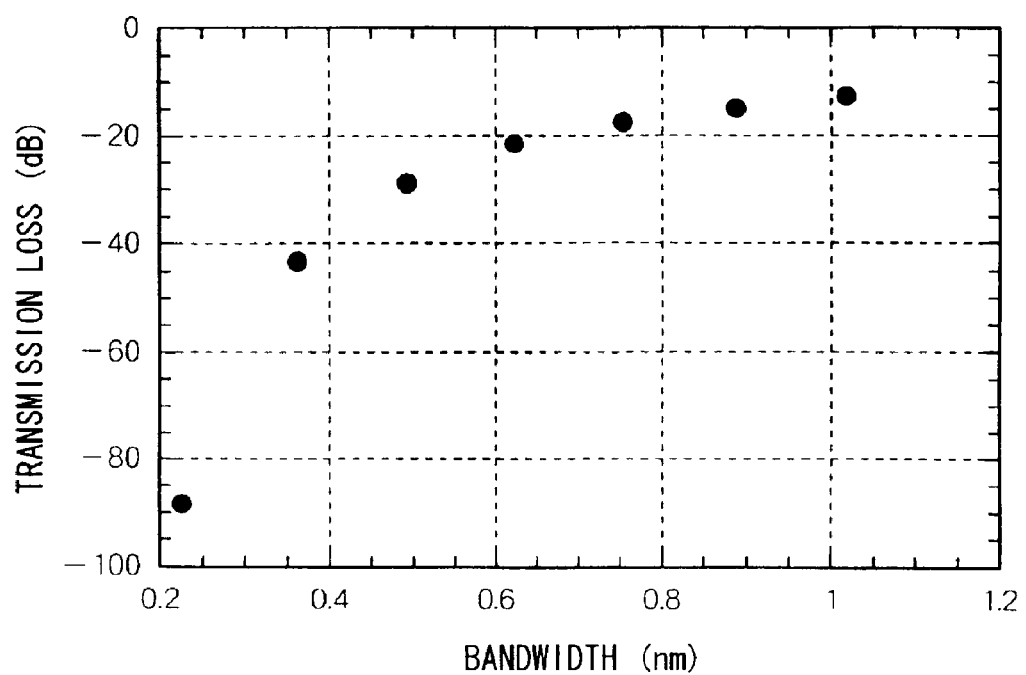
FIG. 7 shows the relationship between the bandwidth and transmission loss when the variable optical fiber grating of the present invention is used as a variable band filter.

Furthermore, it temperature control is used to vary the reflected wavelength band of the optical fiber grating, then the optical fiber grating of this example can be used as a variable band filter. In addition, if the band varies, then the reflectance and the transmissivity also vary accordingly, and consequently the optical fiber grating can also be used as a variable transmission/reflection filter. For example, the relationship between the transmission stopband and the reflection bandwidth obtained using an optical fiber grating with a grating length of 100 mm and a refractive index variation amount of 0.0015 is shown in FIG. 7.

FIG. 6 shows the actual properties obtained when a chirped optical fiber grating is fixed in a spiral shape to a dual ring construction of the shape used in the calculations. This spiral groove is designed so that the coefficient of linear expansion varies linearly along the longitudinal direction of the groove, and so that the temperature dependency of the wavelength shift becomes zero near the center of the spiral. As a result, a construction can be obtained in which only the amount of chromatic dispersion is varied, while maintaining the linearity of the group delay frequency and the center wavelength characteristic. Here, the optical fiber grating is fixed such that the side with the longer grating period is on the shorter radius position of the spiral groove.

Figure 9:
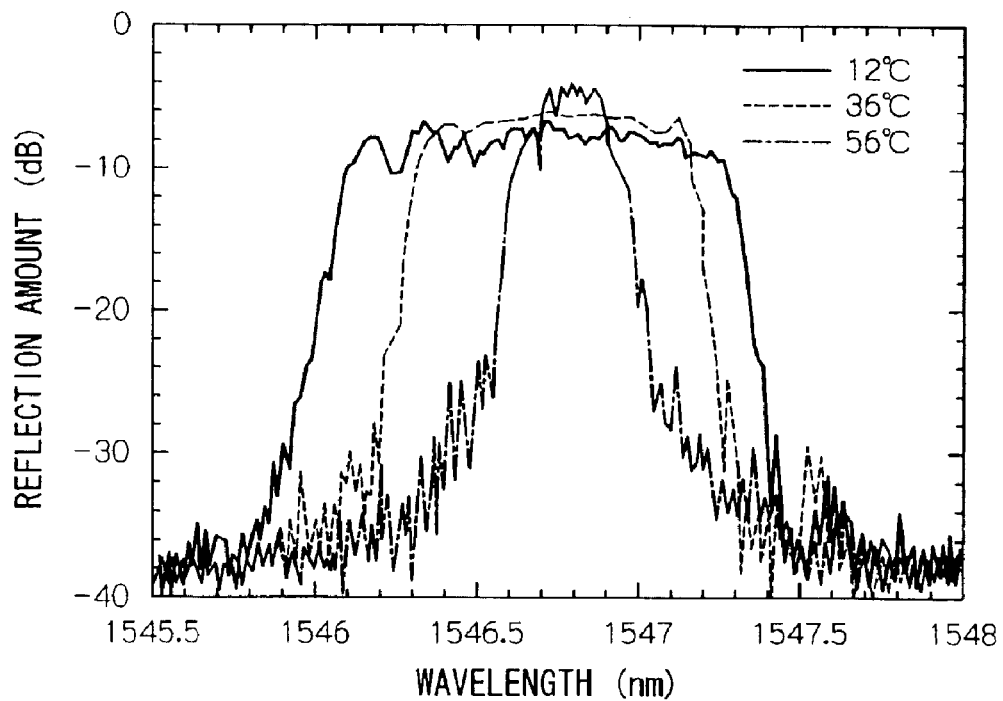
FIG. 9 is a graph showing the results of a specific example of the present invention.

FIG. 9 shows the temperature dependency of the reflected spectrum. It is confirmed that with a rise in temperature, the short wavelength edge of the reflected spectrum shifts towards the longer wavelength and the long wavelength edge shifts towards the shorter wavelength. As a result characteristics according to design where only the reflected band changes with practically no change in the reflected center wavelength are achieved.

Figure 10:
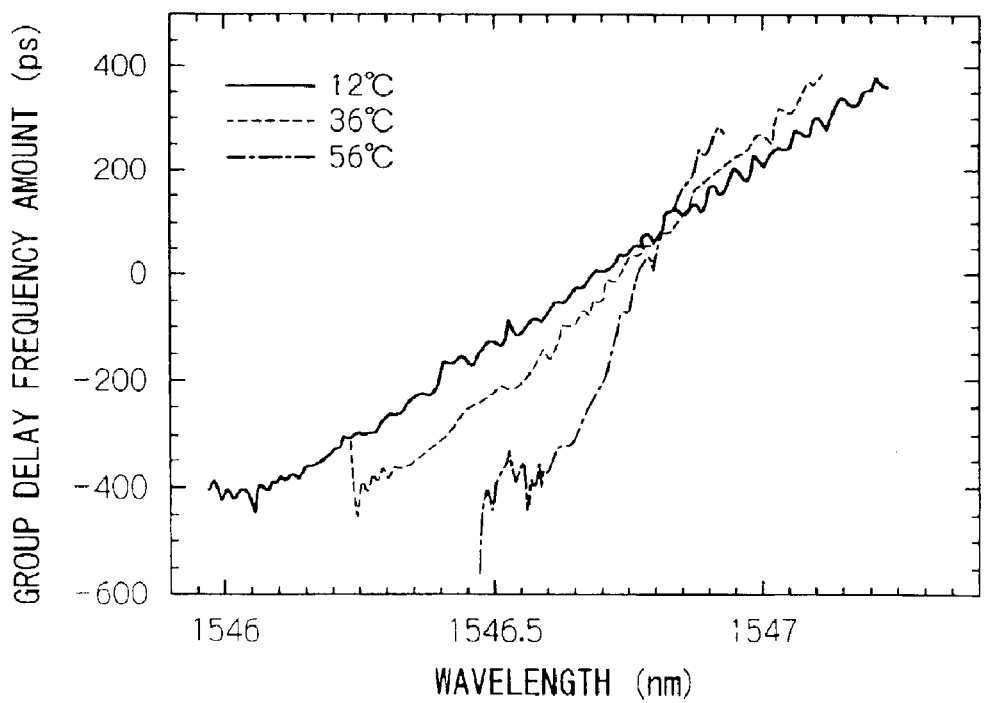
FIG. 10 is a graph showing the results of the specific example of the present invention.

FIG. 10 shows the group delay frequency characteristics. It is confirmed that only the inclination of the group delay spectrum is changed, while maintaining the linear shape.

Figure 11:
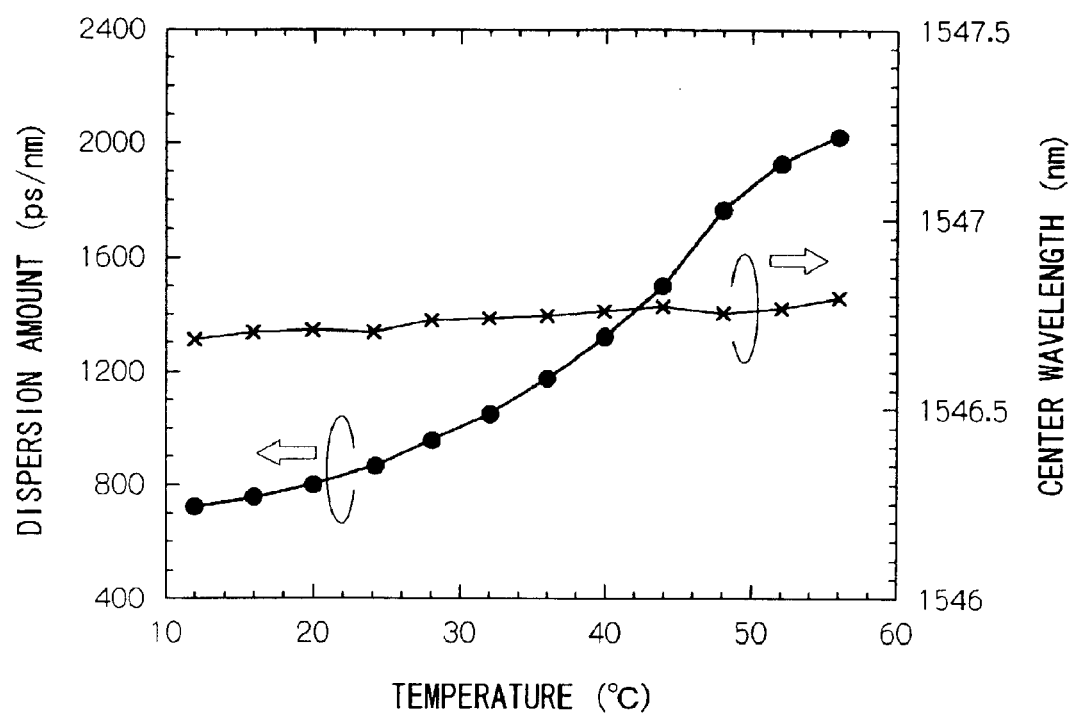
FIG. 11 is a graph showing the results of the specific example of the present invention.

FIG. 11 shows the temperature dependency of the chromatic dispersion amount and the reflected center wavelength of this sample. The chromatic dispersion amount was determined as the inclination of the linear approximation of the group delay characteristics shown in FIG. 10.

As a result, by changing the temperature by 44° C. from 12° C. to 56° C., the amount of chromatic dispersion changed from 750 ps/nm to 2000 ps/nm. Furthermore, the center wavelength variation at this time was less than 0.1 nm over all variable bands, confirming that according to design, a dispersion compensator having a large variable chromatic dispersion region and practically no center wavelength shift was possible.

Here, experiments were conducted for a case where the design of the spiral groove was such that the coefficient of linear expansion varies in a linear manner in the direction of the spiral groove, but if the coefficient of linear expansion is varied in a secondary manner, the chromatic dispersion slope can be made variable. In addition, by expressing the coefficient of linear expansion of the fiber grating fixing position as an optional function along the longitudinal direction of the fiber, the desired variation characteristics can be easily obtained.

As described above, according to the present invention, an optical fiber grating is fixed to a fixing member comprising at least two materials, each having different coefficients of linear expansion, and formed by the material with the higher coefficient of linear expansion surrounding with the material with the lower coefficient of linear expansion, and an amount of chromatic dispersion can be made variable by adjusting a fixing position of the optical fiber grating so that an expansion coefficient and contraction coefficient of the optical fiber grating which follows the expansion and contraction of the material with the higher coefficient of linear expansion, differ along the longitudinal direction of the optical fiber grating. Therefore, it is possible to realize a variable optical fiber grating which is compact, and in which the amount of chromatic dispersion can be effectively varied.

Moreover, by forming the fixing member by providing an outer cylinder comprising the material with a lower coefficient of linear expansion around an inner cylinder comprising the material with a higher coefficient of linear expansion, so that a contour of a contact surface between the materials with different coefficients of linear expansion is a circle, the pressure produced at the interface can be made uniform.

Furthermore, by forming each of the materials with different coefficients of linear expansion using metal, a variable optical fiber grating with high rigidity can be formed.

Moreover, by fixing an optical fiber grating with a grating period which is constant along the longitudinal direction of the optical fiber, to the fixing member, this can be made a chirped optical fiber grating by means of temperature modulation.

Furthermore by fixing a plurality of optical fiber gratings to the fixing member, and changing the fixing position of this plurality of optical fiber gratings, the characteristics of each optical fiber grating can be varied simultaneously, so that a different characteristic variation can be given to each optical fiber grating.

Moreover, by forming a groove in the material, which constitutes the fixing member which has the higher coefficient of linear expansion, and fixing the optical fiber grating in this groove using resin, it is possible to accurately convey the expansion and contraction of the inner cylinder to the optical fiber grating.

Furthermore, by making a coefficient of linear expansion, a Young's modulus and a Poisson's ratio of the resin used when fixing the optical fiber grating in the groove of the fixing member, the same as the coefficient of linear expansion, Young's modulus and Poisson's ratio of the material which has the higher coefficient of linear expansion of the materials which form the fixing member, the occurrence of strain difference between the fixing member and the resin caused by temperature variation is minimal, and the characteristics of the optical fiber grating can be stabilized.

Moreover, by fixing the optical fiber grating to the fixing member with the fixing position thereof set so that when the temperature varies within an operating temperature range, the directions of the variation in the reflected wavelength at each end of the optical fiber grating are mutually opposite, then by means of temperature variation it is possible to change only the amount of chromatic dispersion, while suppressing variations in the reflected center wavelength, that is, the operating center wavelength.

Furthermore, according to the present invention, by compensating for chromatic dispersion of an optical transmission path using the variable optical fiber grating of the present invention, a dispersion compensator, which is compact and capable of effectively performing chromatic dispersion compensation, can be realized.

What is claimed is:

1. A variable optical fiber grating comprising:
an optical fiber grating; and
a fixing member,
wherein said optical fiber grating is fixed in said fixing member,
said fixing member comprising at least a first and a second materials, the first material having a higher coefficients of linear expansion than the second material, the second material with the lower coefficient of linear expansion surrounding the first material with the higher coefficient of linear expansion, and
wherein the optical fiber grating is constituted such that an expansion coefficient and contraction coefficient of said optical fiber grating changes along the longitudinal direction of said optical fiber grating following the expansion and contraction of the first material with the higher coefficient of linear expansion, whereby an amount of chromatic dispersion is varied by temperature modulation by adjusting a fixing position of said optical fiber grating.

2. A variable optical fiber grating according to claim 1, wherein said fixing member is formed by providing an outer cylinder comprising the second material with the lower coefficient of linear expansion around an inner cylinder comprising the first material with the higher coefficient of linear expansion, such that a contact surface between said first and second materials with different coefficients of linear expansion has a circular cross section.

3. A variable optical fiber grating according to claim 1, wherein both of said first and second materials comprise a metal.

4. A variable optical fiber grating according to claim 1, wherein only said second material comprises a metal.

5. A variable optical fiber grating according to claim 1, wherein said optical fiber grating fixed in the fixing member is a chirped optical fiber grating, in which a grating period or the effective refractive index of said optical fiber grating varies along the longitudinal direction of the optical fiber.

6. A variable optical fiber grating according to claim 1, wherein the grating period of said optical fiber grating is constant along the longitudinal direction of the optical fiber.

7. A variable optical fiber grating according to claim 1, wherein a plurality of optical fiber gratings are fixed to said fixing member.

8. A variable optical fiber grating according to claim 1, wherein a groove is formed in the first material, and the optical fiber grating is fixed in said groove.

9. A variable optical fiber grating according to claim 8, wherein a resin is used to fix said optical fiber grating in said groove.

10. A variable optical fiber grating according to claim 9, wherein a coefficient of linear expansion, a Young's modulus and a Poisson's ratio of said resin are the same as respective coefficient of linear expansion, Young's modulus and Poisson's ratio of the first material.

11. A variable optical fiber grating according to claim 1, further comprising a temperature control mechanism for adjusting the temperature of said optical fiber grating.

12. A variable optical fiber grating according to claim 1, wherein said optical fiber grating is fixed to the fixing member with the fixing position thereof set such that, when the temperature varies within an operating temperature range, the directions of the variation in the reflected wavelength at each end of the optical fiber grating are mutually opposite.

13. A dispersion compensator which compensates chromatic dispersion of an optical transmission, said dispersion compensator comprising a variable optical fiber grating, wherein said variable optical fiber grating comprises:
an optical fiber grating; and
a fixing member,
wherein said optical fiber grating is fixed in said fixing member,
said fixing member comprising at least a first and a second materials, the first material having a higher coefficients of linear expansion than the second material, the second material with the lower coefficient of linear expansion surrounding the first material with the higher coefficient of linear expansion, and
wherein the optical fiber grating is constituted such that an expansion coefficient and contraction coefficient of said optical fiber grating changes along the longitudinal direction of said optical fiber grating following the expansion and contraction of the first material with the higher coefficient of linear expansion, whereby an amount of chromatic dispersion is varied by temperature modulation by adjusting a fixing position of said optical fiber grating.

14. A variable optical fiber grating according to claim 13, wherein said fixing member is formed by providing an outer cylinder comprising the second material with the lower coefficient of linear expansion around an inner cylinder comprising the first material with the higher coefficient of linear expansion, such that a contact surface between said first and second materials with different coefficients of linear expansion has a circular cross section.

15. A variable optical fiber grating according to claim 13, wherein both of said first and second materials comprise a metal.

16. A variable optical fiber grating according to claim 13, wherein only said second material comprises a metal.

17. A variable optical fiber grating according to claim 13, wherein said optical fiber grating fixed in the fixing member is a chirped optical fiber grating, in which a grating period or the effective refractive index of said optical fiber grating varies along the longitudinal direction of the optical fiber.

18. A variable optical fiber grating according to claim 13, wherein the grating period of said optical fiber grating is constant along the longitudinal direction of the optical fiber.

19. A variable optical fiber grating according to claim 13, wherein a plurality of optical fiber gratings are fixed to said fixing member.

20. A variable optical fiber grating according to claim 13, wherein a groove is formed in the first material, and the optical fiber grating is fixed in said groove.

21. A variable optical fiber grating according to claim 20, wherein a resin is used to fix said optical fiber grating in said groove.

22. A variable optical fiber grating according to claim 21, wherein a coefficient of linear expansion, a Young's modulus and a Poisson's ratio of said resin are the same as respective coefficient of linear expansion, Young's modulus and Poisson's ratio of the first material.

23. A variable optical fiber grating according to claim 13, further comprising a temperature control mechanism for adjusting the temperature of said optical fiber grating.

24. A variable optical fiber grating according to claim 13, wherein said optical fiber grating is fixed to the fixing member with the fixing position thereof set such that, when the temperature varies within an operating temperature range, the directions of the variation in the reflected wavelength at each end of the optical fiber grating are mutually opposite.

25. A variable optical fiber grating comprising:
an optical fiber;
a first material; and
a second material,
wherein at least a portion of said optical fiber is fixed within the first and second material, said portion constituting an optical fiber grating,
the first material has a higher coefficients of linear expansion than the second material, and
the second material is surrounding the first material.

26. A method of varying amount of chromatic dispersion by temperature modulation in a variable optical fiber grating having at least a portion of an optical fiber fixed within a first and a second material, said portion constituting an optical fiber grating, the first material having a higher coefficients of linear expansion than the second material, and the second material surrounding the first material, said method comprising:

positioning said optical fiber grating such that an expansion coefficient and contraction coefficient of said optical fiber grating changes along the longitudinal direction of said optical fiber grating; and inducing expansion and contraction of the first material by varying temperature applied thereto, thereby varying an amount of chromatic dispersion in the optical fiber grating.

* * * * *